Bassett, Bearse & Wilber,
Making Cut Nails,
No. 2,649, Reissued June 18, 1867.
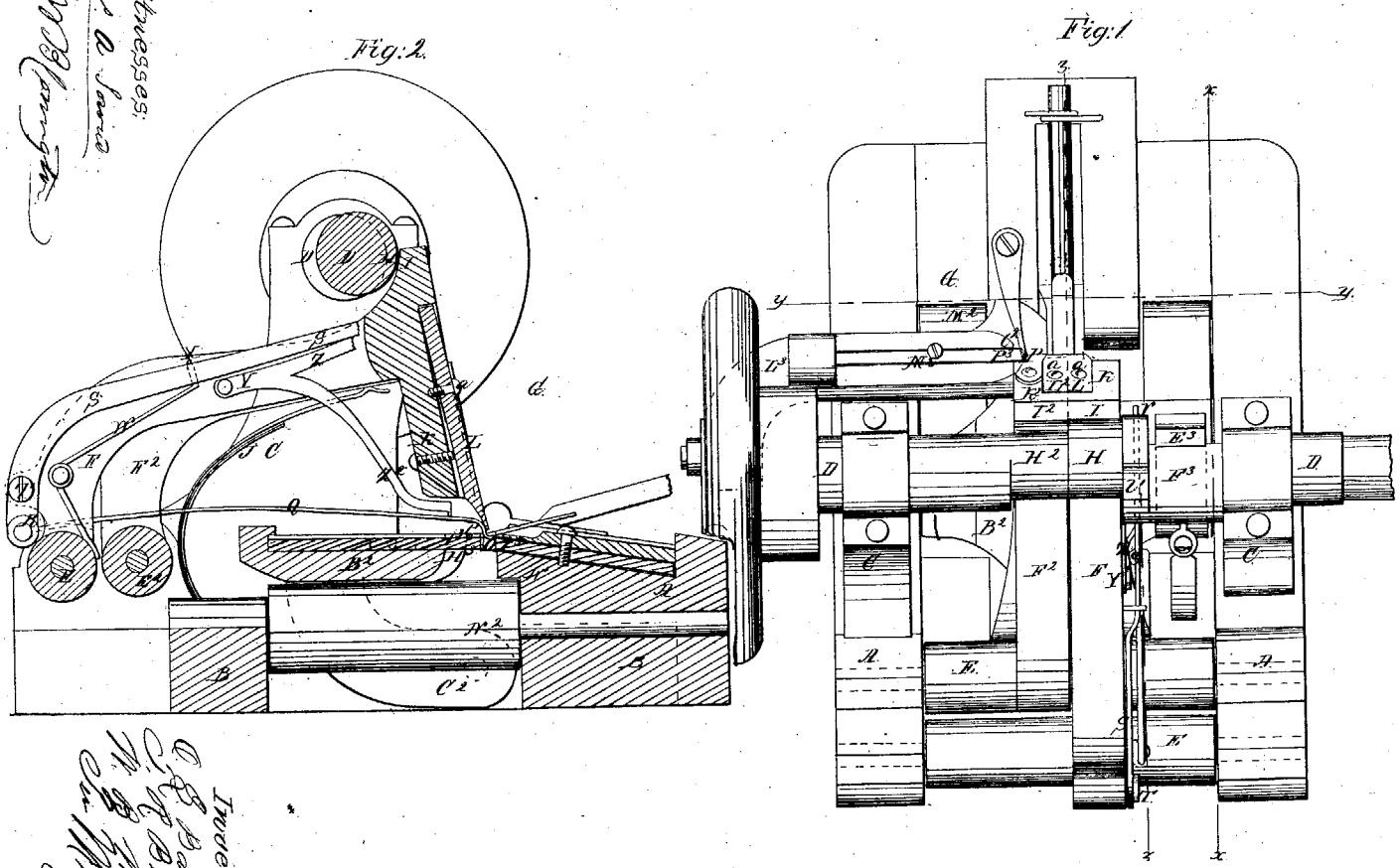
Witnesses:
Jas. A. Sawin
J. W. Blanington
Inventors:
C. S. Bassett
J. R. Bearse
N. B. Wilber
Jr. M. Mott & Co
Attorneys
N. PETERS, PHOTO-LITHOGRAPHER, WASHINGTON, D. C.

Bassett, Bearse & Wilber,
Making Cut Nails,
No 2,649. Reissued June 18, 1867.
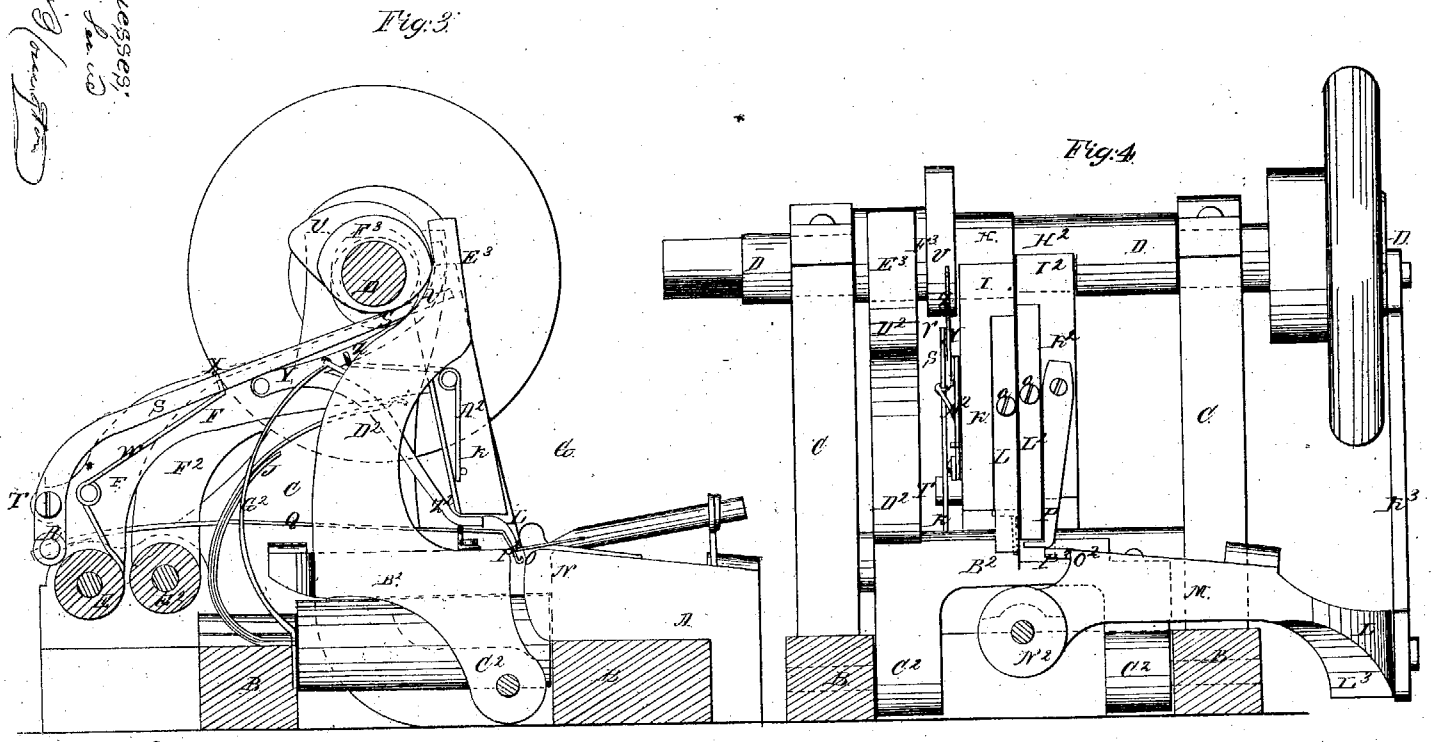
Witnesses:
Jas. A. Lawrd
J. W. Livingston
Inventors:
C. E. Bassett
J. R. Bearse
W. B. Wilber
Per Munn & Co
Attorneys.
N. PETERS, PHOTO-LITHOGRAPHER, WASHINGTON, D. C.

United States Patent Office.

ORIN L. BASSETT, THOMAS R. BEARSE, AND WILLIAM B. WILBER, OF TAUNTON, MASSACHUSETTS.

*Letters Patent No.* 58,577, *dated October* 9, 1866; *reissue No.* 2,649, *dated June* 18, 1867.

IMPROVEMENT IN MACHINES FOR MAKING NAILS AND TACKS.

The Schedule referred to in these Letters Patent and making part of the same.

TO ALL WHOM IT MAY CONCERN:

Be it known that we, ORIN L. BASSETT, THOMAS R. BEARSE, and WILLIAM B. WILBER, of Taunton, in the county of Bristol, and State of Massachusetts, have invented certain new and useful improvements in Tack Machines; and that the following description, taken in connection with the accompanying drawings, hereinafter referred to, forms a full and exact specification of the same, wherein we have set forth the nature and principles of our said invention, by which the same may be distinguished from all others of a similar class, together with such parts as we claim and desire to have secured to us by Letters Patent.

Figure 1, Plate 1, is a plan or top view of the machine.

Figure 2, Plate 1, a longitudinal vertical section, taken in the plane of the line *z z*, fig. 1.

Figure 3, Plate 2, another section taken in a longitudinal direction and vertical plane, and on the line *x x*, fig. 1, plate 1; and Figure 4, Plate 2, a transverse vertical section, taken in the plane of the line *y y*, fig. 1, plate 1.

By the present mode of cutting and making tacks in the "Blanchard" or "double upper cutter" machines, so called, it is almost impossible to produce a small head and a fine or good point, for the reason that the tack, after being cut by the cutters, is carried to the die for producing the head upon it, by that cutter of the two cutters which cuts the portion of the tack from which the head is produced, so that in case the head is small, much difficulty is experienced in the operation, the tack-blank being carried to the die between such upper cutter, and a "carrier" or "bearer" extending out from the right-hand side of the machine. In the present improvements the blank is carried by that cutter of the two upper cutters which cuts the body portion of the blank, in conjunction with a bearer or carrier suitably arranged and operated therefor, to the die in which it is to be headed; the said cutter and carrier being so arranged and operating together as to firmly gripe the tack-blank between the two, as it is carried by them to the die, when the jaws of the die having closed about the blank, the carrier is caused to be withdrawn from it, and passing upwards as well as the cutter, come again into proper position with regard to the cutter for seizing the next tack-blank, and carrying it to the die, and so on as long as the machine is run. By thus seizing and carrying the tack-blank to the die by its body portion, or that nearest to its point, in lieu of by that portion of which its head is formed, as heretofore, no difficulty is experienced in the forming of the head, even if small—an advantage of the utmost importance, and one which, with the machines now in use, it has been impossible to obtain.

In addition to the above, this invention also consists in so arranging and operating the carrier or bearer for the tack, that, before leaving the tack, it shall be depressed therefrom through a forked lever or other suitable means, whereby the great wear of the bearer for the blank, which results from the ordinary mode of arranging and operating it, is entirely obviated, as well, also, as the great disadvantage of a frequent regrinding and readjusting of the carrier, as will be apparent from the explanation which is to follow.

Having thus described in general terms the principal features of the present invention, we will now proceed to explain the same in detail, reference being had to the accompanying plates of drawings, hereinbefore referred to, in which similar letters represent like parts.

A A, in the drawings, represent the framework of the machine, consisting of a bed-frame, B, having parallel uprights, C C. In the upper ends of the uprights C, extending across from one to the other, a horizontal shaft, D, turns, to which shaft the power used for turning the machine is to be connected in any proper manner. E $E^2$, two horizontal parallel rock-shafts, extending transversely across the framework, and turning at each end in suitable bearings of the same. To each of these rock-shafts E $E^2$, respectively, is secured a bent or curved arm, F $F^2$, which arms pass upward toward the front end G of the machine, and under the driving-shaft D, against the respective eccentric portions H $H^2$ of which they bear by their upper and curved ends I $I^2$, that are held firmly against the same, by means of the bow or bent springs J, in contact at one end with the under side of the arms, and at their other ends secured to the bed-frame of the machine. In the respective head-pieces K $K^2$ of the rock-shaft arms F $F^2$, cutters L $L^2$ are secured by set-screws *a*, or in any other proper manner, so that they can be readily removed for being sharpened, with their cutting edges *b* down, and in the same line with each other, forming a continuous cutting edge. N, the block or rest for the metal strip or blank from which the tack-blanks are to be cut, by the edge or end O of which rest the cutters pass. The metal strip is fed along upon this rest N to its end O by any suitable arrangement of feeding devices, or by the hands alone. P, a guard fixed to one of the cutter-heads so as to be in line, or nearly so, with the top of the rest, which guard acts as a stop and limits and regulates the distance to which the metal strip can be moved forward and projected over the edge or end O of the rest or block N. Below the cutting-edge of the cutter L, and in line with the division line between the two cutters, is a hook, $P^2$, which operates as a "carrier" or "bearer" to the tack-blank, as will be hereinafter described. This hook is at the outer end of a long spring-arm, Q, secured at its other end to and in the lower and short arm R of the bent lever S, hung upon a fulcrum, T, of the rock-shaft arm F, and extending by its long arm up and toward the front or cutter-head of the said arm F. Against this lever S the cam-wheel U of the driving or main shaft D acts, depressing its end V, and thus swinging it upon its fulcrum, and consequently moving the spring-hook arm Q in a direction away from the block-rest N. W, a bent spring bearing against the under side of the lever S, throwing it back to its original position and against the stop X of the rock-shaft arm, when the cam-wheel ceases to act upon it. Upon the side of the rock-shaft arm F is hung a forked lever, Y, with its two prongs Z $Z^2$ extending toward the front or cutter-head of the arm; one, Z, upward under the cam-wheel U of the main shaft D, and the other downward and over the hook-spring arm Q near its hook end. The operation of this forked lever upon the hook-arm Q, as its prong is acted upon by the cam U, will be presently explained. $A^2$, a bent spring arranged upon the rocker-shaft arm F, in proper position to act upon the forked lever Y, and throw or move it up, when the cam has ceased to operate upon it. $B^2$, a block, hung by its two arms $C^2$ to the bed-frame B, and in and between the two uprights B B. $D^2$, an upright arm secured to one side or edge of the block $B^2$, which arm $D^2$, by its upper curved end $E^3$, bears against the eccentric portion $F^3$ of the main shaft D. $G^2$, a bent spring, hung at one end to arm $D^2$, and at its other secured to the bed-frame, this spring holding the said arm firmly against the eccentric $F^3$. In the front edge $H^3$ of this block $B^2$, one jaw, $I^3$, of the die is secured, directly opposite to which, in the rest or block O, the other jaw, $J^3$, is fixed, the two jaws being made of suitable form upon their ends, facing each other, to grasp the tack-blank when inserted in and between the two, and when they are brought together by the action of the eccentric $F^3$ of the shaft D, upon the arm $D^2$ of the block $B^2$, holding one jaw of the die. To one end of the main shaft D, and eccentric therewith, is hung one end of a pitman or connecting-rod, $K^3$, the other end of which is hung to the outer end of the bent or curved portion $L^3$ of the arm or bar $M^2$, secured to the horizontal shaft $N^2$, turning or rocking in suitable bearings of the bed-frame, and extending in the direction of its length. In the end $O^2$ of the bar or arm $M^2$, a hammer, $P^3$, is secured, which hammer projects toward the jaws of the die, and is brought to bear against the projecting end of the metal blank held therein, at the proper times to "upset," and thus head the same, by the swinging or rocking of the arm $M^2$, caused by the turning of the shaft D through the connecting or pitman-rod $K^3$, hereinbefore referred to.

The operating of the machine is as follows: The metal strip from which the tacks are to be made is first placed upon the block or rest N, with one end toward its end O and against the guard or stop P. Then turn the driving-shaft D in the proper direction, by which the two cutters L $L^2$ are then brought down and upon the said metal strip or plate through the action of the eccentrics H $H^2$ upon the rock-arms on which they are secured, cutting off the projecting end of such strip beyond the edge O of the rest N. The cutter $L^2$ then remaining stationary, the other cutter L, or that which cuts the portion of the tacks constituting its body and point, continues its downward movement, by the peculiar form of the eccentric operating the same, firmly and tightly nipping the tack-blank in the hook $P^2$ of the spring-arm, which it depresses, thereby carrying the blank down with and in it, into and between the two open jaws $I^3$ and $J^3$ of the die. The jaws $I^3$ and $J^3$ are then closed upon the tack-blank by the forward movement of the movable die $I^3$ of the two, which, firmly clasping and holding the said blank between them, while the hammer $P^3$ is brought to bear upon its projecting end, a head is produced upon it. The hook, while such heading is taking place, is depressed by the prong $Z^2$ of the forked lever Y, so as to clear the tack-blank, leaving it in the die, when the arm being drawn back by the action of the lever S, to which it is hung, it then moves upward, resuming its original position under the cutter L, and in place for the next tack-blank cut from the metal strip by the cutters, that, during the above-described action of the hook or carrier $P^2$ and the hammer, have been raised, and brought by means of the springs J to their original position for again descending upon the metal strip or bar from which the tacks are cut, by continuing the rotation of the driving-shaft D, after which the die-jaws open from each other, releasing the tack between them that falls out of the machine.

From the above description of our improved machine for making tacks, it is plain to be seen that the cutter, which, in connection with the carrier $P^3$, conveys the tack-blank to the die, is the one by which the body and "point" portion of the tack is cut, whereby tacks with small heads can be made, which, with the manner of conveying the tack-blank to the die, heretofore employed by the action of such one of the cutters as cuts the head portion of the blank, it was impossible to do, as is well known to all conversant with the use of such machines—a very important disadvantage and inconvenience, from the fact that the greater proportion of tacks used are those having small heads. It may be here observed that by depressing the "carrier" from the tack-blank through the means of a forked lever, as hereinbefore explained, in lieu of directly drawing or hauling it off, as is the case in tack machines, by the arrangement of the carrier heretofore employed in such machines, the carrier is thereby relieved of a great amount of friction and wear, which hitherto has been the source of much annoyance and trouble, as it occasioned a frequent regrinding and readjusting of the carrier.

And, furthermore, in addition to the above, it may be here observed that through the action of the forked lever upon the carrier, such carrier, as it passes or is drawn back to its position for taking the next tack made in the machine to the dies, can be retained or held from contact with the cutter, thus also avoiding and obviating much of the friction upon and wear to the carrier, which have hitherto resulted to it by the old and common mode employed of operating it. Although we have herein described the tack-carrier as depressed through the means of a forked lever, it is plainly obvious that levers or devices of other shapes can be employed, and be either arranged to operate in the precise manner described, or in other and various ways, which will cause the desired result or effect to be produced, and therefore we do not intend to limit ourselves to the use of any one particular device for depressing the carrier from the tack-blank, nor to any one particular mode of operating such device.

And, furthermore, in lieu of attaching the carrier directly to the cutter-arm, it may be arranged to operate independent of it, or to receive its motion through some other part of the machine.

Having thus described our invention, we claim as new, and desire to secure by Letters Patent—

1. The combination of a carrier or bearer for the tack-blank, with any one of the cutters, be they more or less in number, used for cutting the tack-blanks, when arranged and so as to operate substantially in the manner and for the purpose specified.

2. The carrier or bearer for conveying the tack-blanks to the die to be headed, in combination with a forked or other suitable lever, arranged with regard to the said carrier, and so as to operate upon it and with the cutter, substantially as and for the purpose described.

3. The lever S, pivoted to either a fixed or movable fulcrum, in combination with the carrier Q, cam-shaft D, forked lever Y, and cutter, substantially as described for the purpose specified.

ORIN L. BASSETT,
THOMAS R. BEARSE,
WILLIAM B. WILBER.

Witnesses:
GEO. W. WHITE,
CHAS. G. MORTON.